Nov. 7, 1950     C. W. WALZ ET AL     2,528,805
BEET HARVESTER
Filed Feb. 23, 1945     4 Sheets-Sheet 1
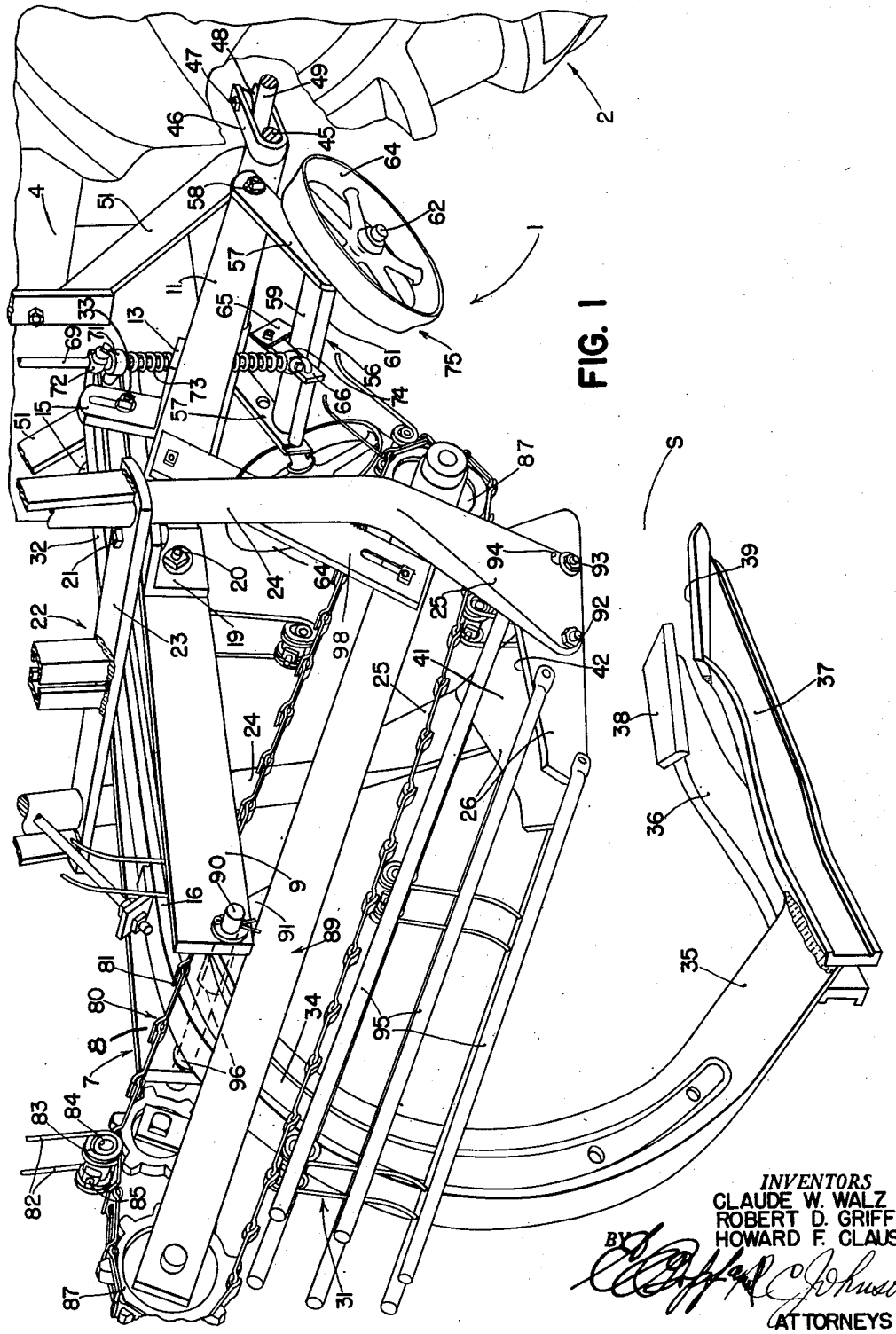
FIG. I
INVENTORS
CLAUDE W. WALZ
ROBERT D. GRIFF
HOWARD F. CLAUSEN
BY
ATTORNEYS

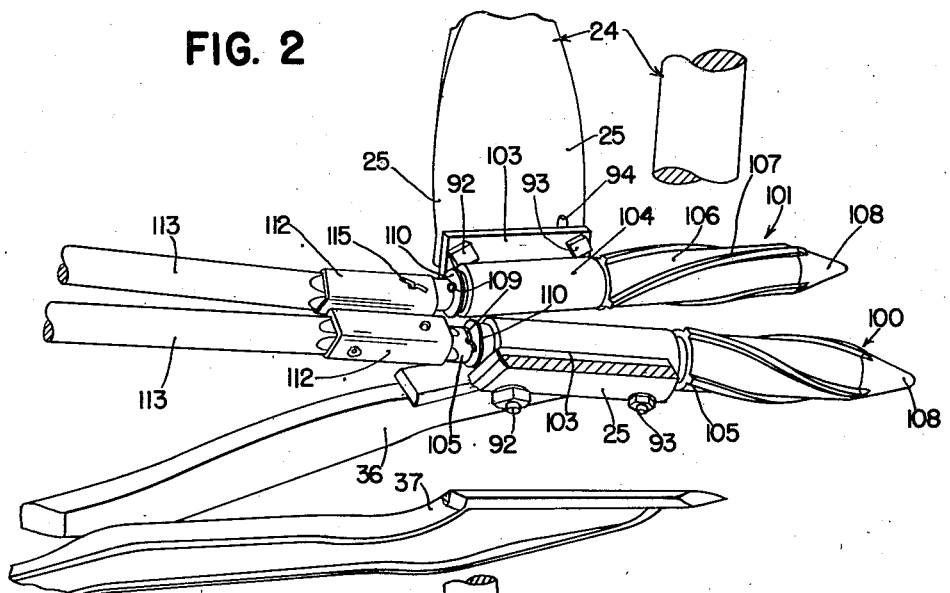
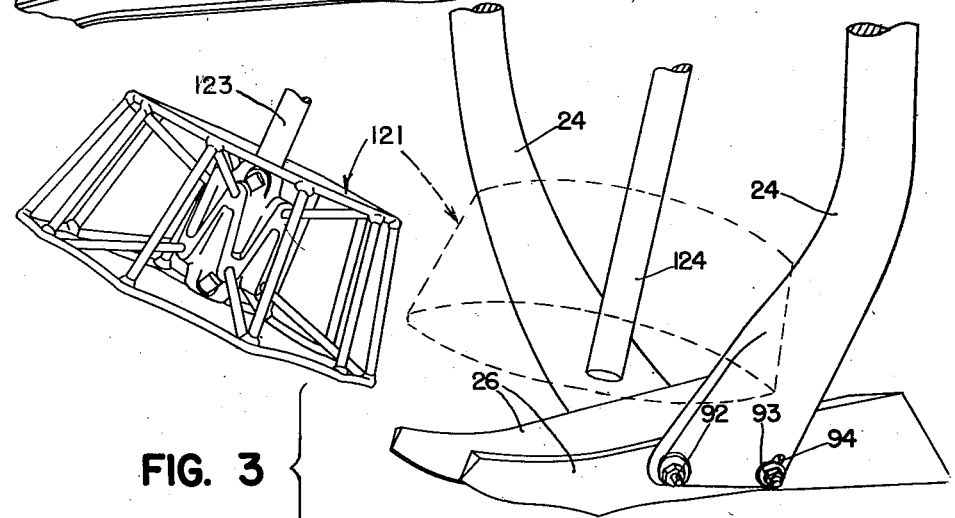
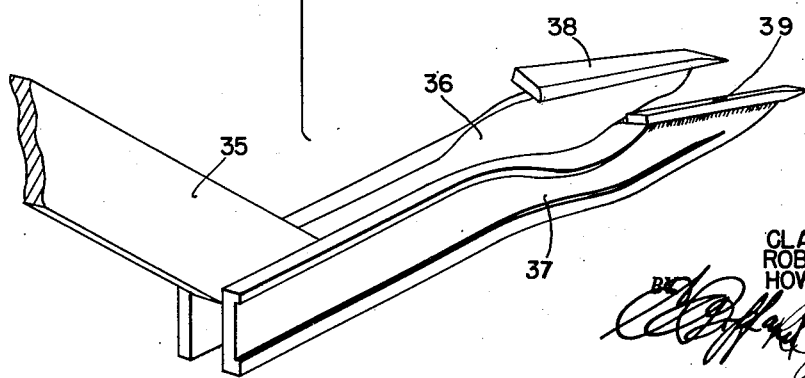

Nov. 7, 1950     C. W. WALZ ET AL     2,528,805
BEET HARVESTER
Filed Feb. 23, 1945                              4 Sheets-Sheet 3
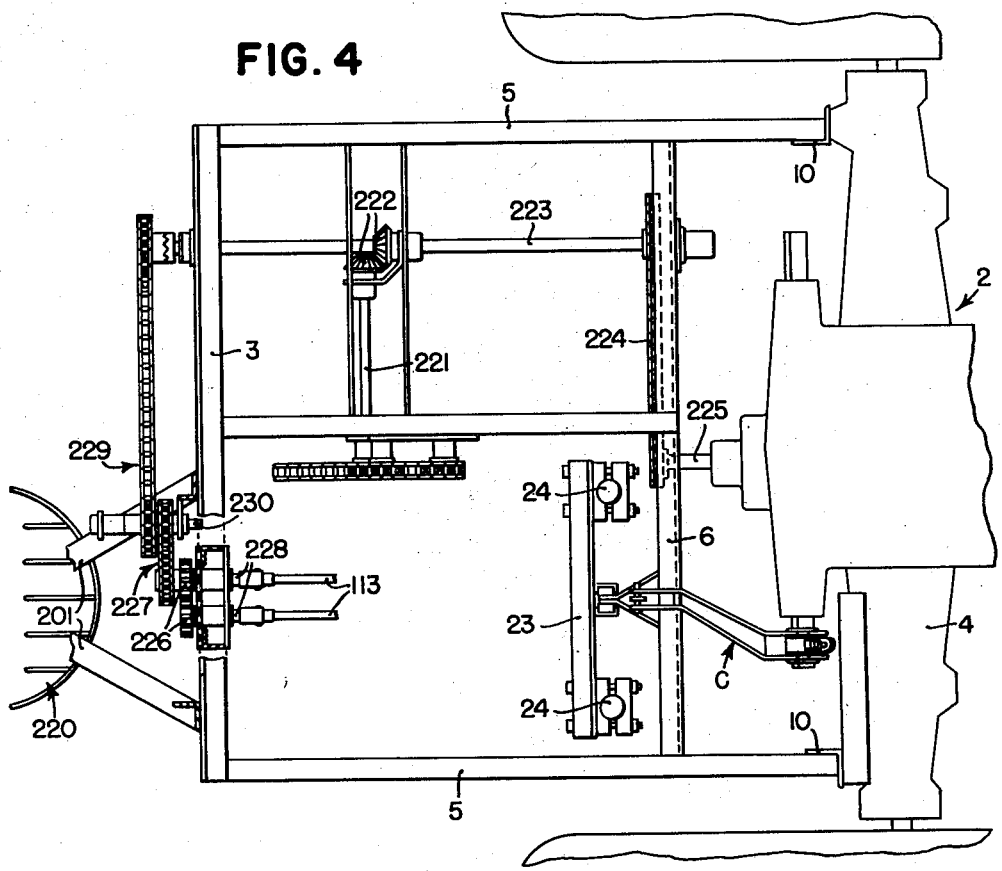
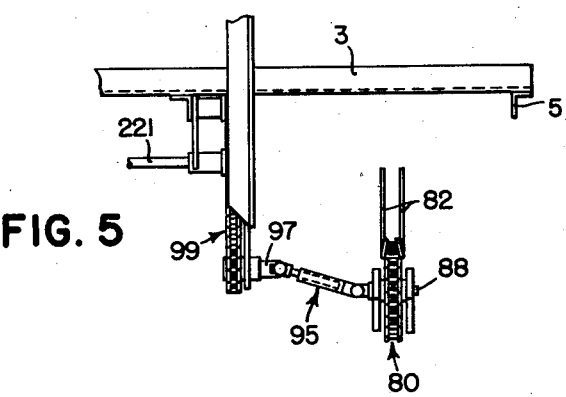
INVENTORS.
CLAUDE W. WALZ, ROBERT D. GRIFF
HOWARD F. CLAUSEN
BY
ATTORNEYS

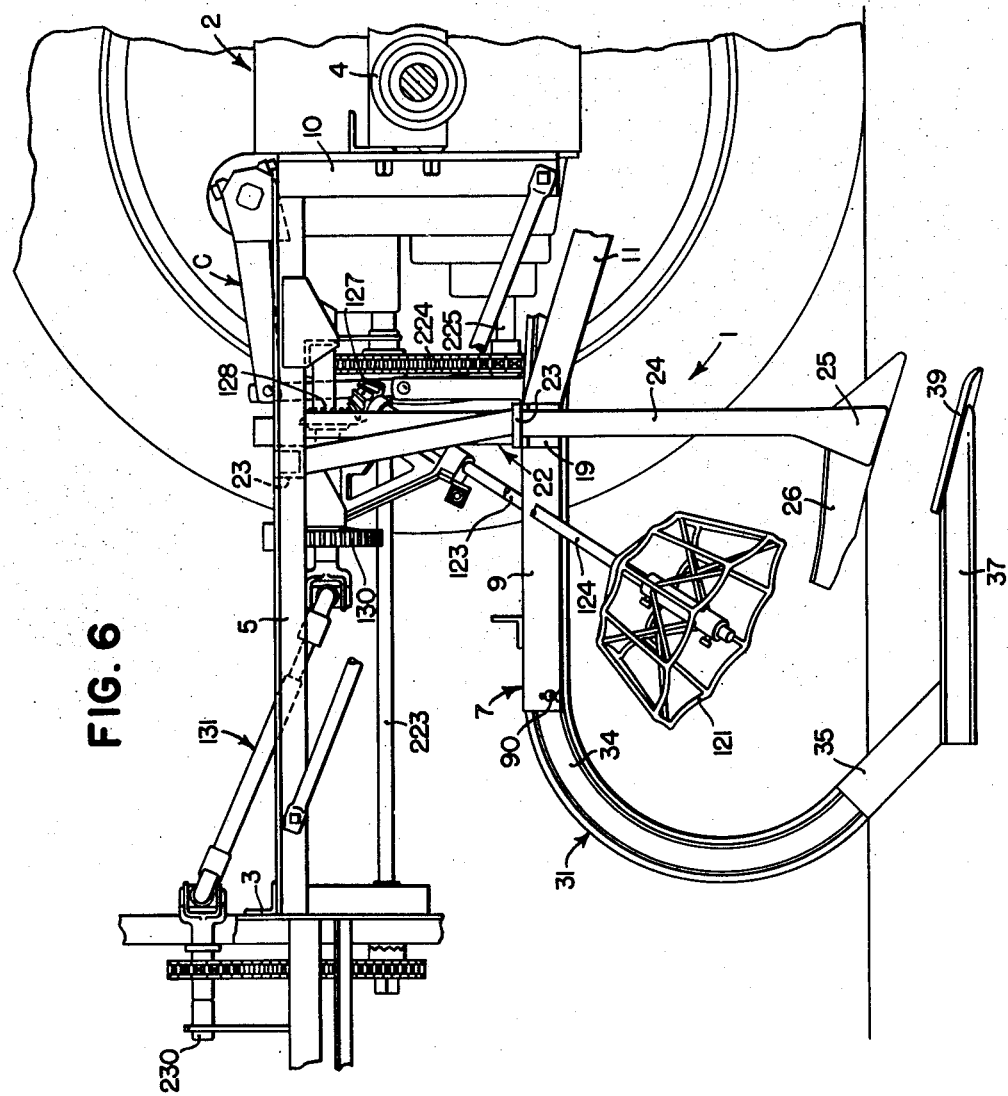

Patented Nov. 7, 1950

2,528,805

UNITED STATES PATENT OFFICE 2,528,805

BEET HARVESTER

Claude W. Walz and Robert D. Griff, Rock Island, and Howard F. Clausen, Moline, Ill., assignors to Deere & Company, Moline, Ill., a corporation of Illinois Application February 23, 1945, Serial No. 579,380

10 Claims. (Cl. 55—106)

The present invention relates generally to agricultural machines and more particularly to machines for harvesting root crops, such as sugar beets and the like.

The object and general nature of the present invention is the provision of new and improved harvesting mechanism for such crops as sugar beets or the like and particularly constructed and arranged so as to reduce or eliminate picking up clods with the beets. More particularly, it is a feature of this invention to provide a pair of lower laterally spaced points adapted to penetrate the ground and loosen the soil from around the lower portion of the beet, in conjunction with a pair of upper lifting points adapted and constructed to raise the beet from the soil loosened by the lower points. Another important feature of the present invention is the provision of new and improved means for keeping the two sets of lifting points in operative position on the row. Still further, another feature of this invention is the provision of beet lifting means in which the upper set of points are rotatable and constructed and arranged to impart an additional lifting effect for raising the beets from the soil loosened by the lower points. Another feature of this invention is the provision of new and improved means for preventing the upper points, whether fixed or rotary, from overturning the beet forwardly in the soil loosened by the lower points.

These and other objects and advantages of the present invention will be apparent to those skilled in the art after a consideration of the following detailed description of the preferred structure in which the principles of the present invention have been incorporated.

In the drawings:

Figure 1 is a perspective view of our new lifting unit, showing the same as incorporated in a tractor mounted beet harvester.

Figure 2 is a fragmentary view, similar to Figure 1, showing the use of upper rotatable points instead of upper fixed points as shown in Figure 1.

Figure 3 is a view also similar to Figure 1 but showing the use of kicker wheels above the upper points rather than a beet engaging chain as shown in Figure 1.

Figure 4 is a fragmentary plan view showing one form of supporting frame at the rear of a farm tractor and associated driving connections driven from the tractor motor.

Figure 5 is a fragmentary rear view, looking forwardly, of the frame shown in Figure 4, showing the means for driving the beet-engaging hugger chain shown in Figure 1.

Figure 6 is a fragmentary side view of the form of the invention shown in Figure 3, showing certain details of the kicker wheel driving mechanism and associated parts.

Referring now to the drawings, particularly Figure 1, the beet lifting unit with which the present invention is more particularly concerned is indicated in its entirety by the reference numeral 1 and has been shown as a part of a tractor mounted harvester constructed along the lines of the beet harvesters shown in the copending United States application, Serial No. 485,526, filed May 3, 1943, by Claude W. Walz et al., now U. S. Patent 2,438,627, issued March 30, 1948, and U. S. Patent 2,463,447, issued March 1, 1949, on a continuation-in-part application, Serial No. 534,952, filed May 10, 1944, now Patent 2,463,447 based on application, Serial No. 485,526, to which reference may be made is necessary. Briefly, the beet lifting unit of such a harvester is carried at the rear of a tractor 2 and is supported by rearwardly extending frame and brace members generally rearwardly of a rear axle 4 of the tractor. These members are substantially the same as the frame construction shown in said U. S. Patent 2,438,627, and hence need not be shown in detail here. For purposes of this description it will suffice to note that, as shown in Figure 4, the harvester frame includes a rear crossbar 3, a pair of outer side bars 5, a front crossbar 6, and vertical members 10 attachable to the rear axle 4 of the tractor 2 on which the harvester is adapted to be mounted. The drive mechanism and other parts will be referred to later.

According to the principles of the present invention the beet lifter unit 1 comprises a lifter frame or sub-frame 7 that is made up of a pair of generally longitudinally extending frame members 8 and 9 shaped to extend downwardly at their forward ends, as at 11. The forward ends 11 of the frame members 8 and 9 are connected together by a cross piece 13 preferably welded thereto. A pair of slotted lugs 15 are secured, as by welding, to the center portion of the cross piece 13. A pair of clips 19 are bolted, as at 20, to the center portions of the longitudinally extending frame members 8 and 9 and receive bolts 21 which secure a framework 22 thereto. The framework 22 is vertically movable, preferably by connecting to the power lift arms C of the tractor, and is shown in detail in the above mentioned patents. The framework 22 is provided with upper and lower members 23 which are apertured to receive generally vertically extending standards 24, the lower ends of which are flattened and bent laterally inwardly, as at 25, to receive a pair of upper stationary lifting points 26. The standards 24 are fixed to the framework 22.

A rigid beam member 31 has a front straight section 32 apertured to receive a bolt 33 which fastens the front end of the beam to the brackets 15. The rear portion 34 of the beam 31 is apertured to receive a pin 90 which with bushings 96, serves to fasten the rear portion of the beam 31 rigidly to the rear ends of the frame bars 8 and 9. The rear end of the beam 31 extends downwardly and forwardly, as at 35, similar to an ordinary plow beam, and receives a pair of lower rigid lifting points 36 and 37. These lower points 36 and 37 have blade-like faces 38 and 39 secured to the main portions 36 and 37 of the points preferably by welding. Preferably, but not necessarily, the lower points are spaced apart laterally somewhat greater than the spacing between the rear ends of upper points 26 but somewhat less than the spacing between the front ends. The upper points are also arranged more nearly vertical than the faces 38 and 39 of the lower points, each of which latter points, in one embodiment of the invention, makes an angle of approximately 60 degrees with respect to the vertical, while each of the upper points 26, that is, the faces 41 and 42 thereof, make an angle of approximately 30 degrees with respect to the vertical, that is, a vertical longitudinal plane.

The front ends 11 of the longitudinal frame members 8 and 9 are apertured to receive a draft bar 45, and disposed about the latter is a pair of U-shaped straps 46, the forward ends of which receive a bushing and bolt means 47 on which a roller 48 is mounted. The rollers 48 run along a bar 49 that is supported by a pair of brackets 51 from the rear axle 4 of the tractor. This construction forms a draft transmitting means between the tractor-carried bar 49 and the beet lifter unit 1, permitting the same to shift either laterally or vertically as may be required by the terrain.

For holding the unit 1 on the row of beets, we provide a swinging frame 56, comprising a pair of strap members 57 pivoted, at 58, to the front ends 11 of the frame members 8 and 9 and rigidly connected together at their rear ends by a cross pipe 59. An axle 61 is secured to the rear or lower ends of the members 57 and is bent downwardly, as at 62 to receive guide members in the form of wheels 64 which are held on the axle ends 62 by any suitable means. A lug 65 is welded or otherwise permanently secured to the cross pipe 59 and receives an arm 66, preferably bolted thereto, and the rear end of the arm 66 is apertured to receive the lower laterally bent end of a vertical rod 69 which extends through the eye of an eyebolt 71 carried by the front end of the beam 31. A collar 72 is disposed on the rod 69 of the eyebolt 71 and a compression spring 73 is confined between the eyebolt 71 and an adjustable collar 74 on the lower end of the rod, preferably adjacent the arm 66. The function of the spring 73 is to yieldingly urge the guide unit, which is indicated in its entirety by the reference numeral 75, in a generally downwardly direction. The wheels 64 are inclined laterally outwardly so as to act more effectively to hold the unit 1 on the row. In some cases the row of beets may be ridged sufficiently to guide the wheels 64, or in other instances the wheels may either be guided by the beets themselves or by shoulders which may be formed on the ridges by the coulters (not shown) which are usually employed and which are carried by or at the front of the tractor.

The operation of the beet lifter unit 1 shown in Figure 1 is substantially as follows.

When the tractor 2 is in position straddling the row of beets it is desired to lift, the power lift unit of the tractor is lowered to permit the points 26 and 36, 37 to enter the ground. The parts are so arranged that the lower points 36, 37 penetrate the ground for a considerable depth and, in general, pass along the lower portions of the beets to loosen the latter from the soil surrounding the lower portions of the beets. There is, of course, slight vertical displacement of the soil and hence the latter is broken and loosened by the passage of the lower points. Due to the relatively flat disposition of the faces 38 and 39, the soil is urged upwardly to some degree, along with the beet. The upper points 26 operate in a shallow position in the soil loosened by the lower points, the upper and lower points being spaced apart vertically so that the major portion of the loosened soil passes between the points, that is, through the space S between the upper and lower points, the upper points 26, acting, in effect, to hold the loosened soil down while, by virtue of the slight upward disposition and rearward convergent positioning of the points, serving to lift the beet from the loosened ground but without raising any clods or the like that may be present.

In order to prevent the beets, which lie in the soil loosened by the lower points 36 and 37, from being pushed forwardly and overturned by the upper points, we preferably provide beet engaging means in the form of an endless hugger chain indicated in its entirety by the reference numeral 80 and including a chain proper, at 81, provided with a plurality of resiliently mounted fingers 82 secured to certain links of the chain 81 in any suitable manner. Preferably, the resilient fingers 82 form the outer portions of coil springs 83 which are mounted on a transverse pipe member 84 that in turn is fixed to an arm 85 which is welded to one of the adjacent links in such a position that the pipe member 84 lies against the rear adjacent link in operation. The endless chain unit 80 is supported on upper and lower sprockets 87 carried in a downwardly inclined frame 89 and secured in any suitable manner to the laterally outer frame member 9, preferably by a bracket 91 fixed to rock on a cross pin 90. The latter extends through an opening in the beam 31, and short sleeves 96 are disposed on each side of the beam, and the ends of the cross pin 90 are extended through openings in the rear ends of the frame bars 8 and 9, whereby the beam 31 is securely held in position. A link 98 is connected at its upper end to the frame bar 9 and at its lower end has a bolt and slot connection with the frame 89 for lifting the latter when the lifting unit is raised but which permits a floating action when the unit is operating. Cotters and washers at the ends of the cross bar 90 hold the latter in position in the frame bars 8 and 9.

The fingers 82 are arranged to engage the beets at about the time they reach the narrower parts or rear ends of the points 26. The frame 89 extends laterally and rearwardly at one side of the curved portion 34 of the beam carrying the lower points, and for guiding the beets we provide a plurality of rods 95 welded at their forward ends to the shanks or standards 24 and/or adjacent portions of the points 26. Any suitable conveyor or elevator may be provided for receiving beets from the rear ends of the rods, and the upper sprocket 87 is driven in any suitable manner from the power takeoff shaft of the tractor 2.

The conveyor and driving means may be substantially like that shown in the above mentioned U. S. Patent 2,438,627 and hence need not be shown in detail here. For example, and as clearly disclosed in said patent, the harvester frame carries an elevator supporting framework including a pair of rearwardly converging angle members 201 which at their forward ends are welded to the frame angle 3. By means of a supporting yoke and other parts, shown in detail in said patent, the elevator supporting framework carries a rear elevator which in Figure 4 is represented by a hopper 220 which forms the receiving end of the elevator.

The hugger chain sprocket 87 is fixed to a shaft 88 that is driven by a telescopic shaft and universal joint unit 95 (Figure 5) from a shaft 97 which is driven by sprocket and chain means 99 from a cross shaft 221 (Figure 4) carried by the harvester frame. The cross shaft 221 is driven by a pair of bevel gears 222 one of which is fixed to a longitudinal shaft 223 journaled in the harvester frame and driven by a sprocket and chain means 224 from the tractor power take-off shaft 225.

The upper points 26 are fixed to the flattened lower ends 25 of the standards 24 by any suitable means, such as a pair of bolts 92 and 93, each of the bolts 93 being received in a slot 94 formed in the lower end of the standard 24 to provide for adjusting the angular position of the points 26 to raise or lower the front ends thereof.

Under certain conditions it may be desirable to impart a greater lifting effect to the beets than can be secured by a pair of fixed points, such as the points 26 shown in Figure 1. To this end, the present invention contemplates the provision of a pair of rotatable points that may be substituted for the fixed points 26. Referring now to Figure 2, a pair of rotatable points 100 and 101 are shown as mounted on the lower ends of the standards 24 in place of the fixed points 26. Each of the rotatable points comprises an attaching bracket or plate 103 apertured to receive the bolts 92 and 93. A bearing sleeve member 104 is secured, as by welding, to the lower end portion of each of the attaching brackets 103, and each attaching plate 103 is adapted to be mounted in the same position on the standard 24 as the fixed points 26, and also is similarly adjustable. A shaft 105 is disposed for rotation in each of the bearing sleeves 104 and at its forward end receives a point member 106 having spiral ribs 107 thereon, the member 106 is pointed at its front end, as at 108, and the ribs 107 continue over at least a portion of the pointed end 108. The rear end of each shaft 105 is apertured to receive a cotter 109 which holds a thrust washer 110, at the rear end of the bearing sleeve 104, in position. Rearwardly, each shaft 105 is squared to receive a squared connecting member 112, the rear end of which is adapted to receive the squared end of a driving shaft 113. Cotters 115 serve to hold the shafts 113 and 105 connected with the square sleeves 112, the latter having sufficient clearance with respect to the shafts so that minor variations in the alignment of the shafts 105 and 113 may readily be accommodated. The shafts 113 are driven in any suitable manner, preferably by a pair of spur gears 226 and sprocket and chain means 227 (Figure 4) for driving the latter from one of the driven shafts supported on the beet harvester framework 3. Preferably, the rear ends of the shafts 113 are connected by universal joints to short shafts 228 carrying the gears 226. The shafts 228 are carried by suitable bearing means supported by the frame angle 3, and the sprocket and chain unit 227 is driven by the sprocket and chain means 229 which is utilized for driving the shaft 230 that, as shown in U. S. Patent 2,463,447, drives a kicker wheel unit.

The rotatable points 100 and 101 are disposed above the fixed points 36 and 37 in about the same relative position as the fixed points 26 (see Figure 1). However, due to the rotation of the points 100 and 101 the beets are given an upward movement, the larger beets being propelled generally upwardly by the forward points 100 and 101 while the smaller beets that reach the square sleeves 112 are propelled upwardly by the rotation of the latter. Any suitable beet engaging and conveying means may be employed for taking the beets from the rotatable point units just described.

Instead of the hugger chain 89 (Figure 1) we may employ a pair of kicker wheels for engaging and removing the beets from the upper points. Referring now to Figures 3 and 6, a pair of kicker wheels 121 are shown as fixed to a pair of downwardly and rearwardly divergent shafts 123 and 124. The kicker wheels 121, the kicker wheel shafts 123 and 124, and associated parts are constructed and driven in substantially the same way as is disclosed in the above-mentioned Patent No. 2,463,447, and hence further detailed description is believed to be unnecessary. It will suffice for purposes of the present description to note that the upper ends of the shafts 123 and 124 carry bevel gears 127 which are driven by gears 128. The latter gears are fixed to shafts that are interconnected by spur gears 130 which are driven by shaft means 131 from the shaft 230, mentioned above.

While we have shown and described above the preferred construction in which the principles of the present invention have been incorporated, it is to be understood that our invention is not to be limited to the particular details shown and described above, but that, in fact, widely different means may be employed in the practice of our invention in the broader aspects of our invention.

What we claim, therefore, and desire to secure by Letters Patent is:

1. In a beet harvester, a mobile supporting means, a pair of beet lifting members carried by said supporting means for lateral shifting movement relative thereto, means serving as a subframe to which said beet lifting members are connected, and a pair of guide wheels movably mounted on said sub-frame for generally free vertical oscillation relative thereto ahead of said lifting members so as to cause said guide wheels to guide said lifting members by the position of the beets in the row before the beets are lifted, and means acting against said sub-frame for biasing said guide wheels for downward movement so as to hold said guide wheels on the row of beets being harvested.

2. In a beet harvester, a pair of downwardly extending standards, journal members secured, respectively, to the lower ends of said standards and arranged with their axes converging rearwardly, shafts rotatable, respectively, in said journal members, a pair of beet engaging points, one fixed to each of said shafts and each of said points including a soil penetrating part, said standards being spaced apart a distance sufficient to cause said soil penetrating parts to engage opposite sides of the beets just below the portions thereof of greatest diameter, and means for driving said shafts including non-circular sections disposed rearwardly of said journal members and spaced apart a distance such as to engage each beet generally below the wider portions thereof, the angle of convergence of said journal members being sufficient to dispose said rearward non-circular sections closer together than said journal members.

3. In a beet harvester, a beet lifter unit including a pair of lower lifting points, an upper pair of lifter points, there being an open space therebetween to accommodate a flow of soil between the upper and lower points, a pair of beet engaging kicker wheels mounted above and adjacent the rear portion of said lifter points, and means connecting and supporting said upper and lower lifter points and said beet engaging kicker wheels.

4. In a beet lifter, a supporting frame, a pair of generally vertically extending standards carried by said frame in such position thereon that the lower ends of said vertically extending standards normally are disposed below the ground surface, an upper pair of laterally spaced beet-engaging members carried at the lower ends, respectively, of said standards and each including a forward beet-engaging portion adapted to engage the beet below the widest portion thereof and to penetrate the ground to so engage the beet, each of said members including a rotatable section rearwardly of the associated standard, said rotatable sections being supported closer together than said forward beet-engaging portions, so as to engage the tails of the beets raised by the forward portions of said beet-engaging members, supporting means carried by said frame rearwardly of said standards and including downwardly and forwardly extending sections, the forwardly extending sections extending forwardly to a point adjacent and generally below the level of said upper pair of beet-engaging members, and a pair of lower laterally spaced beet-engaging members fixed to said downwardly and forwardly extending sections in a position substantially directly underneath said upper beet-engaging members.

5. In a beet lifter, a pair of generally vertically extending standards, an upper pair of laterally spaced beet-engaging members carried at the lower ends, respectively, of said standards and each including a forward beet-engaging portion adapted to engage the beet below the widest portion thereof and to penetrate the ground to so engage the beet, each of said members including a rotatable section, said rotatable sections being supported closer together than the forward portions of said beet-engaging members, a pair of lower laterally spaced beet-engaging members disposed substantially directly underneath said upper beet-engaging members, generally rearwardly extending supports for said lower beet-engaging members, and means for raising and lowering both said upper and lower beet-engaging members together.

6. In a beet harvester, a mobile ground supported frame, a pair of upper laterally spaced beet lifting members carried by said frame in a position to extend below the surface of the ground so as to engage the upper portions of the beets while the latter are still in the ground, a pair of lower beet lifting members, carried by said frame in substantially the same vertical fore and aft extending planes as said upper lifting members and spaced apart laterally so as to pass on opposite sides of the lower portions of the beets and loosen the soil about the beets, common frame means to which said upper and lower beet lifting members are connected, and means connected therewith for raising and lowering both said upper and lower beet-engaging members together.

7. In a beet harvester, a supporting frame, a pair of upper laterally spaced lifters, a pair of lower laterally spaced lifters, means connecting said lower lifters to the frame in such position that the lower lifters serve to loosen the soil about the lower portions of the beets, means for connecting said upper lifters to the frame in such position that the upper lifters serve to raise the beets from the loosened soil, means carried by said frame above the rear portions of said lifters for engaging the beets and urging them rearwardly relative to said upper lifters, and means connected with the frame for supporting said beet engaging means so as to dispose the forward portions of said beet-engaging means ahead of the forward portion of said upper lifters, whereby the beet engaging means engages a beet about the same time the beet is engaged by said upper lifters so as to prevent the travel of the upper lifters from overturning the beets in the loosened soil.

8. In a beet harvester, a mobile supporting means, means serving as a sub-frame movable vertically and laterally relative to said supporting means, a pair of beet lifting members carried by said sub-frame for movement therewith, ground engaging guide means carried by said sub-frame adjacent the forward portion thereof and forwardly of said beet lifting members, and means for raising both said sub-frame means and said guide means relative to said supporting means.

9. In a beet harvester, a mobile supporting means, a pair of beet lifting members carried by said supporting means, means serving as a sub-frame to which said beet lifting members are connected, means connecting the sub-frame with said supporting means for lateral shifting movement relative thereto, a pair of guide wheels to straddle the beets in a row, and means movably connecting said guide wheels with said sub-frame so as to accommodate generally vertical movement of said guide wheels.

10. In a beet harvester, a beet lifter unit including a pair of lower lifter points, an upper pair of lifter points, there being an open space therebetween to accommodate a flow of soil between the upper and lower points, beet engaging means mounted above and adjacent the rear portion of said lifter points, a common frame means to which both the upper and lower pairs of lifter points are connected, and means connected with said frame means for raising and lowering both said upper and lower pairs of lifter points together.

CLAUDE W. WALZ.
ROBERT D. GRIFF.
HOWARD F. CLAUSEN.

REFERENCES CITED

The following references are of record in the file of this patent:

UNITED STATES PATENTS

| Number | Name | Date |
|---|---|---|
| 910,467 | Fox | Jan. 19, 1909 |
| 913,422 | McCormick | Feb. 23, 1909 |
| 937,592 | Gilbert | Oct. 19, 1909 |
| 1,479,929 | Ricks | Jan. 8, 1924 |
| 2,221,765 | Graham | Nov. 19, 1940 |

FOREIGN PATENTS

| Number | Country | Date |
|---|---|---|
| 869 | Great Britain | 1907 |
| 426,318 | Great Britain | Pub. 1935 |